Sept. 28, 1943.    M. F. PETERS ET AL    2,330,236
DEVICE FOR MEASURING GAS LEAKAGE
Filed July 8, 1942    2 Sheets-Sheet 1
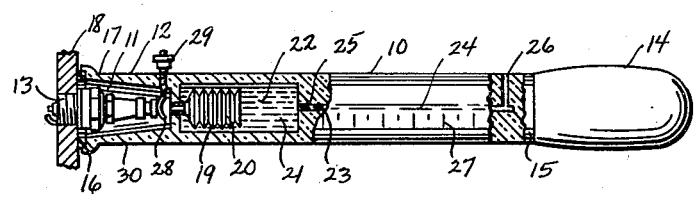
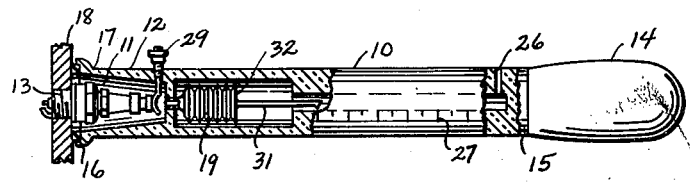
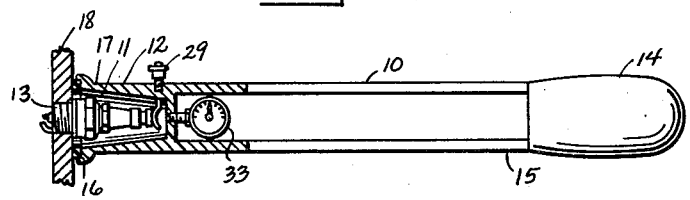
INVENTORS
Melville F. Peters
BY John P. Boston
ATTORNEY Sept. 28, 1943.  M. F. PETERS ET AL  2,330,236
DEVICE FOR MEASURING GAS LEAKAGE
Filed July 8, 1942  2 Sheets-Sheet 2
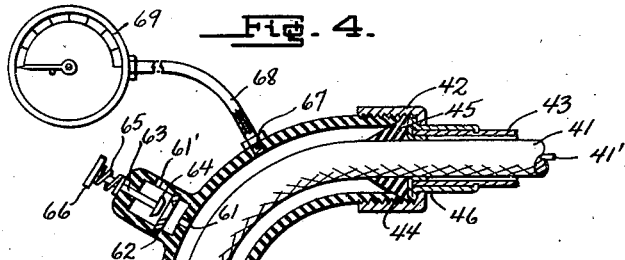
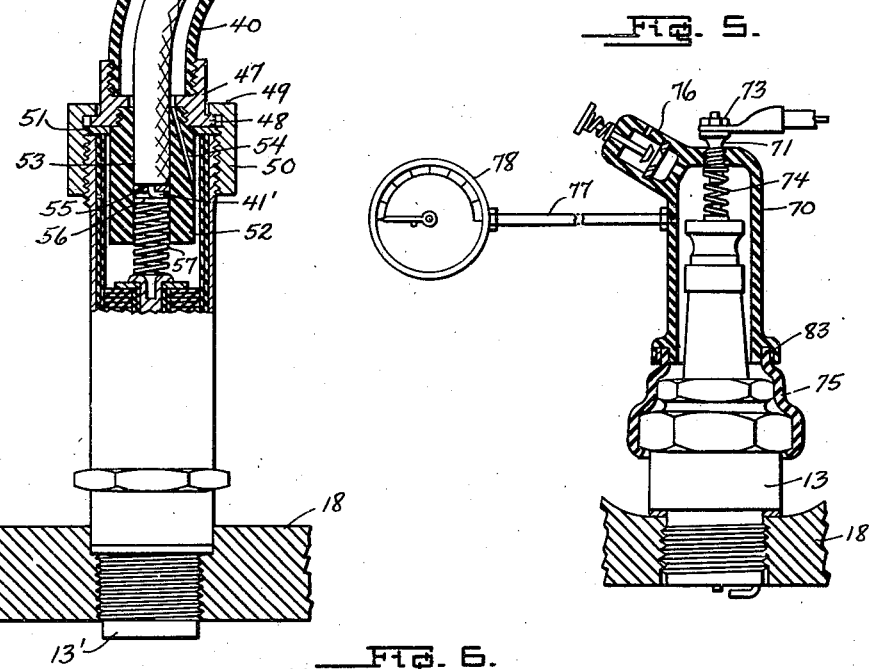
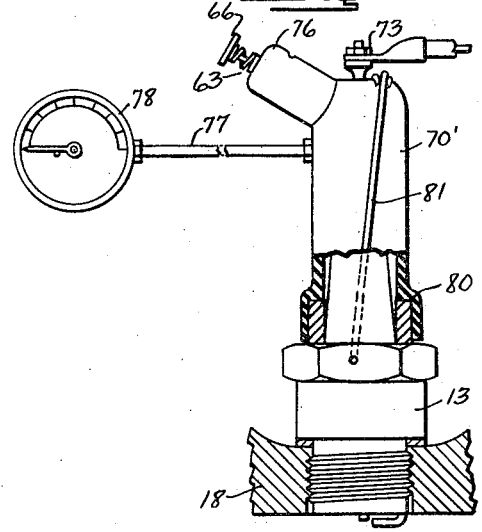
INVENTORS
Melville F. Peters
John P. Boston
BY
ATTORNEY Patented Sept. 28, 1943

2,330,236

UNITED STATES PATENT OFFICE 2,330,236

DEVICE FOR MEASURING GAS LEAKAGE

Melville F. Peters, Beltsville, and John P. Boston, Garrett Park, Md.

Application July 8, 1942, Serial No. 450,200

9 Claims. (Cl. 73—51)

(Granted under the act of March 3, 1883, as amended April 30, 1928; 370 O. G. 757)

This application is a continuation in part of our copending application Serial No. 419,582, filed November 18, 1941 now abandoned.

This invention relates to apparatus for measuring gas leakage and more particularly to apparatus for measuring the gas leakage through and around ignition devices, especially those ignition devices which are to be used in internal combustion engines.

It is a primary object of this invention to provide an apparatus which will permit the rate of gas leakage of a spark plug to be measured with extreme precision when the said spark plug is installed in an operating cylinder of an internal combustion engine.

In carrying out the above object of this invention, we prefer to utilize the devices which normally serve to connect a detachable ignition lead of an internal combustion engine to an installed and operating spark plug and to modify the said devices to the extent of providing a space enclosed by said device with a gas-tight sealing means which includes a normally open pressure releasing and sealing valve. A conduit is connected to the said device for the purpose of transmitting pressure variations of the gas contained within the void space to a suitable pressure indicator thus permitting the gas leakage rate to be measured by observing the rate of increase in pressure within said void space. This type of apparatus has an advantage over that disclosed in the parent application Serial No. 419,582 in that the void space within the sealed enclosure has a relatively small volume. This permits relatively slight leakage rates to be sensitively detected or precisely measured. Furthermore, the gas contained within the relatively small volume is more easily maintained at a substantially constant temperature throughout the period during which the leakage measurements are being taken. The gas within the void space is maintained at a substantially constant temperature due to the fact that temperature differentials occurring in the apparatus utilized are small, consequently, the possibility of errors attributable to temperature variations is materially lessened and the condensation of liquid in the void space within which gas pressure measurements are obtained is effectively inhibited.

It is well known that the gas leakage of an internal combustion engine spark plug decreases the preignition rating of the spark plug causing its normal operating temperature to be increased. If the leakage is great enough, the spark plug temperature may be sufficiently high to cause preignition in the engine. This preignition further aggravates conditions by producing excessive pressure and causing the engine to overheat. Owing to the fact that gas leakage is dependent upon the screw joint tightness of the spark plug where it enters the engine as well as upon the leakproof quality of the plug itself under various temperatures and pressure conditions to which the spark plug is subjected, it is desirable to determine the leakage rate wtih the spark plug installed in an operating internal combustion engine. The measured leakage rate should include the leakage rate around the base of the plug as well as the leakage rate through the plug structure.

It is also an object of this invention, therefore, to provide an instrument which will enable one to detect the rate of gas leakage through the spark plug as well as around the screw joint, said instrument permitting these leakage measurements to be taken with the plug operating, i. e. with the plug installed in an operating internal combustion engine.

Notwithstanding the desirability of having an instrument which can be used to measure the rate of leakage through the structure of a spark plug as well as around the screw joint connection, it should also be evident that this leakage rate cannot be taken as a useful index of the leak-proof quality of the plug itself since a greater portion of the leakage rate measured may be due to the screw joint tightness of the plug where it enters the engine. It is also desirable, therefore, to have available an instrument which may be utilized to measure the leakage rate through the plug only, so that the leakage rate measured would be indicative of the leak-proof quality of the particular spark plug.

It should be noted that we have accomplished this object of the invention by the apparatus which utilizes the devices which serve normally to connect the detachable ignition leads to the spark plug since the gas leakage measured by this device necessarily includes only that leakage through the plug structure. The advantage of this type of instrument are twofold, since in the first place measurements obtained through its utilization serve as a useful index of the plug's condition and in the second place, when used in conjunction with the apparatus which measures the total gas leakage, it is easy to determine what portion of the leakage rate is due to the screw joint tightness.

Other objects, uses and advantages of this invention will become more apparent during the course of the following description taken in connection with the accompanying drawings, wherein:

Fig. 1 is an elevational view, partly in cross-section, of a specific type of device in which the total volume of gas leakage through and around a spark plug is measured and indicated by a change in the height of the column of mercury in a capillary tube;

Fig. 2 is an elevational view, partly in cross-section, of a modification of the species of this invention illustrated in Fig. 1 in which the mechanical motion of a Sylphon bellows is used to measure the gas leakage volume;

Fig. 3 is an elevational view, partly in cross-section, of a further modification of the invention illustrated in Figs. 1 and 2, showing how the apparatus may be used to employ a low pressure gauge to register the pressure increase due to the gas leakage within a fixed volume surrounding the spark plug, thus giving an indication of the gas leakage rate;

Fig. 4 is a cross-sectional, elevational view of a modification illustrating a preferred embodiment of this invention wherein the member which serves normally to connect the detachable ignition lead to a radio shielded spark plug is modified to permit gas leakage measurements;

Fig. 5 is an elevational view in cross-section of a further modification showing the invention applied to a member which serves to connect the detachable ignition lead to an unshielded spark plug; and Fig. 6 is an elevational view, partly in cross-section, of a further modification.

Before proceeding with a description of the various illustrated embodiments of this invention, it may be well to again emphasize the two types or species of instruments which we have disclosed for measuring the gas leakage. The first general type, originally described and claimed in a copending application Serial No. 419,582, filed November 18, 1941, now abandoned, of which this is a continuation in part, is manually applied to the spark plug and measures the leakage through the plug itself and also the gas leakage around the screw joint where the plug enters the engine block or head. The second general type illustrated in Figs. 4, 5, and 6, employs a device used to connect a detachable ignition lead to the spark plug and modifies the device so as to enable the gas pressure within a relatively small volume to be percisely measured. Any increase in the gas pressure as measured by this latter device would serve as a useful index of the spark plug's condition, since the leakage of the gas producing this pressure increase must take place through the structure of the plug itself.

The preferred modification of this invention falling within the first of the aforementioned classifications which permits detection of a very minute quantity of gas leakage with extreme precision, is illustrated in Fig. 1. In most cases the gas leakage encountered will be small, consequently, this species of our invention will probably eventually find broadest application.

The instrument, as illustrated, consists specifically of a cylindrical barrel 10 which has a cavity 11 at an end 12 adapted to receive the spark plug 13 through which and around which the gas leakage rate is to be measured. A handle 14 is provided at the other end 15 of the barrel 10 and comprises the means through which a manual pressure is applied to temporarily seal the plug 13 within the cavity 11. A sealing ring 16, constructed of rubber or other similarly suitable gasket material, is located at the base of the cavity forming wall 17 and provides the gas-tight sealing joint with the portion 18 of the engine head or block when pressure is manually applied at the handle 14 of the instrument. Within the barrel 10 is a small gas-tight and liquid-tight bellows 19 which is adapted for longitudinal expansion when a slight pressure increase is communicated to its interior 20 from within the spark plug receiving cavity 11. Expansion of the bellows 19 displaces the liquid 21 from within the fluid filled reservoir 22 of the barrel 10. The overflow of the liquid indicated at 23 is forced into a capillary tube 24 which is connected to the liquid filled reservoir 22 at the end 25 and which opens to the atmosphere at the other end 26. The barrel 10 is inscribed with suitable graduations 27 along the length of the capillary tube 24. These graduations are calibrated so that the height of the liquid within the capillary tube may be interpreted in terms of pressure. By timing a set increase in the height of the displaced liquid 23 as it enters and fills the capillary tube 24, an extremely accurate indication of the rate of gas leakage from and around the spark plug 13 may be procured. Ignition current is supplied to the plug by a conventional spring type contact 28 which is connected to an insulated conductor 29 passing through the wall 30 of the cavity 11.

Referring now to the embodiment of our invention shown in Fig. 2, an indicator rod 31 operable over a scale 27 is rigidly attached to the free surface 32 of the bellows 19 and replaces in function the liquid 21, the reservoir 22, and the capillary tube 24 of Fig. 1 as the means for indicating on the scale 27 the changes in pressure in the cavity 11. This species of the invention is more rugged than is that illustrated in Fig. 1 and is useful for determining measurements of larger leakage, although with less precision than the device shown in Fig. 1. Except for this difference in construction the remaining features of the modification in Fig. 2 are identical with those in Fig. 1. Hence, reference characters similar to those used in Fig. 1 indicate similar parts.

Referring now to the embodiment of this invention shown at Fig. 3, a pressure gauge 33 of the low pressure Bourdon type replaces in function the rod 31 and the scale 27 of the modification illustrated in Fig. 2 and the liquid 21, reservoir 22 and the capillary tube 24 of the modification illustrated in Fig. 1, as the means for determining the pressure differences within the cavity 11. The differences in operation between the devices illustrated in Figs. 1 and 2 from that shown in Fig. 3 is that in the former, differences in volume are measured to indicate gas leakages, whereas in the latter increases in pressure due to gas leakages are sensitively indicated and precisely measured. In Fig. 3 gas leakages from around the spark plug as well as through the spark plug 13 enter the cavity 11 which is of a fixed volume and cause a gas pressure to be built up in this cavity. Increases in this gas pressure are indicated on the pressure gauge 33. In other respects the features of Fig. 3 are identical in construction with those of Fig. 2 and similar reference characters are employed to indicate similar parts, with the noted exception that in Fig. 3 the barrel 10 of the device is constructed of an electrically conductive material and is insulated from the engine block or head by means of the dielectric gasket material 16. In this case, the ignition current supply conductor 29 may be attached directly to the barrel 10 to form an electrically conductive path from the conductor 29 to the spring contact 28. The particular features of the devices illustrated in Figs. 1-3, inclusive, lend themselves to considerable variation in their use and application to the field of internal combustion engines employing spark plugs as the ignition producing means. One such possibility includes a machine having as many of these devices as there are spark plugs applied to a manifold of an engine undergoing test in a test line, whereby all of the spark plugs may be tested for gas leakage simultaneously. As soon as an engine has undergone appropriate test it could be rapidly moved down the line and another engine moved into the test stand. In this manner all of the spark plugs may be rapidly tested by an apparatus involving a minimum number of operations and electrical connections.

Fig. 4 illustrates a further modification of this invention which is characterized by the fact that it falls within the latter of the two general classifications set out above. The apparatus disclosed in this modification is adapted to accurately measure or indicate the gas leakage through a radio shielded spark plug 13' and includes the conventional elbow 40 of the shielded spark plug ignition lead 41. The detachable ignition lead or cable 41 which preferably extends from the spark plug terminal to the terminal of the manifold conductor leading from the magneto in a manner well understood in the art and particularly disclosed and described in the United States patent to M. F. Peters et al. No. 2,164,591, is passed through the elbow so as to substantially fill the space enclosed thereby. One end of the elbow is threaded so as to receive the flanged nut 42 which is provided for the purpose of securing the elbow to the metallic shielding tube 43. This end of the elbow is also provided with a tapered circular recess 44 adapted to receive the conically formed packing 45 of rubber or other suitable compositions. The packing is substantially the shape of a truncated cone, but the portion adjacent the base thereof may have a short cylindrical extension. This packing 45 is disposed around the insulated cable 41 and is forced into the tapered recess 44 so that its inclined face abuts the inclined face of the recess 44. The flanged end 46 of the shield tube 43 terminates adjacent the base of the packing 45 and is forced against the base of this packing when the flanged nut 42 is tightened on the threaded portion of the elbow 40. The force thus applied to the flanged end 46 of the tube 43 urges the inclined faces of the packing 45 against the conical seat and makes a gas-tight seal between the cable 41 and the elbow 40. For a more detailed description of the type of packing similar to that disclosed, reference may be had to the United States Patent No. 2,087,920.

The spark plug end of the elbow has secured upon it the metallic member 47 having a flange 48 engaged by the flange 49 on the threaded nut 50 which is adapted to be screwed on to the spark plug shield to hold the elbow tightly and securely thereto. A gasket 51 is interposed between the elbow and the shield to insure a gas-tight joint at this end of the elbow. Threaded into the member 47 is a tubular mounting 52 of insulating material having a centrally formed bore 53 through which extends the insulated cable 41. This mounting member 52 is provided with a passageway 54 permitting easy escape or passage of the gas leakage through the spark plug into the enclosed space formed by the elbow. A metallic washer 55 surrounds the conductor 41' of the insulated cable 41 so as to bear against the insulation. The disc 56 to which a spring 57 is soldered is disposed within the bore 53 and bears against the washer 55 to make electrical contact therewith. The spring 57 acts to connect the conductor 41' with the electrode of the spark plug and is of such resilience as to tightly press the washer 55, disc 56 and spark plug terminal together so that there will be a good firm electrical contact between these members when the elbow is threaded on to the spark plug radio shield.

The elbow 40 is also provided with a vent 61 to atmosphere having a valve seat 62 formed therewith. The operating stem 63 for the valve closure disc 64 has a compressional spring 65 associated therewith to retain the closure disc 64 in a position displaced off the valve seat. A button 66 is secured to an end of the operating stem 63 so that upon the application of a manual force thereto the closure disc 64 will be firmly pressed against the seat, so as to seal the escape of gas from within the enclosure formed by said elbow. A second opening 67 is provided in this elbow 40 into which one end of an oil filled capillary tube 68 is sealed; the other end of this tube is connected to a low pressure gas gauge 69 of the Bourdon type. The normally open vent 61 is necessarily provided to prevent excessive pressures from being built up within the enclosure formed by the elbow 40 during the intervals when the leakage rates are not being observed. In order to determine the rate of gas leakage the button 66 is held down manually and the reading of the gauge 69 is noted. Consecutively timed readings of the gauge are also noted to determine the rate of increase in pressure which is an index of the gas-tight condition of the spark plug.

Obviously, plugs other than those provided with a radio shield are subject to gas leakage. Consequently, the instrument or apparatus disclosed in Fig. 5 is provided for the purpose of detecting the rate of gas leakage through the type of unshielded spark plug. As illustrated, the device consists specifically of a cap 70 formed preferably of an insulating material such as Bakelite, for example. A terminal 71 is molded or threaded into this cap and one end is threaded to receive the nut 73 by means of which the ignition cable may be secured thereto. The inner end of the terminal 71 has a spring 74 soldered thereto which is adapted to engage the spark plug terminal in the manner illustrated. The base of the cap 70 is provided with a suitable elastic material 75 which is configured to encircle the plug 13 and to hold the cap thereon and provides a gas-tight seal of the enclosure formed therewith. As illustrated, this elastic material 75 is cemented as at 83 to the Bakelite cap 70. We do not propose to be limited to the particular means of securing the elastic material or for that matter to the type of cap illustrated in Fig. 5; in fact, the cap construction illustrated in the United States patent to Sousa, No. 2,121,178, may be adapted to accomplish the purpose of this invention by providing a suitable gas-tight enclosure of the space formed thereby as illustrated by Fig. 6. The cap 70, as illustrated, is also provided with a normally open manually operated pressure release valve 76 which vents to atmosphere and with an oil filled capillary tube 77 which is sealed to cap 70 and leads therefrom to the Bourdon type pressure gauge 78. The valve 76 prevents excessive pressure from being built up within the enclosure defined by the cap 70 when measurements of the gas leakage rates are not being taken. In order to observe the gas leakage through the plug, it is only necessary to manually close the valve 76 and note the rate of increase in pressure on the dial of the pressure gauge 78.

In the modification illustrated in Fig. 6, the cap 70' has a suitable ring gasket 80 located at the base of the cap. The cap 70' is secured in place by the spring clip 81 forcing the gasket 80 into gas-tight engagement with the plug 13. In other respects, Figs. 5 and 6 are similar and both are similar to Fig. 4 as regards the construction of the valve and similar reference numerals have been used to indicate their corresponding parts.

It should be understood that the forms of our invention shown and described herein are to be taken as preferred examples and it is understood that various changes in the shape, size and arrangements of parts may be resorted to without departing from the spirit of our invention or the scope of the subjoined claims.

The invention described herein may be manufactured and used by or for the Government of the United States of America for governmental purposes without the payment of any royalties thereon or therefor.

We claim:

1. An apparatus for determining the rate of gas leakage through a spark plug when it is installed in a cylinder of an operating internal combustion engine, comprising in combination a means for enclosing at least a portion of said spark plug protruding exteriorly of said cylinder within a gas-tight enclosure and means for detecting changes in the gas pressure within said enclosure, said enclosing means including means for applying an ignition potential to the electrode of said spark plug without permitting gas leakage between said enclosure and the atmosphere, whereby the gas leakage rate may be determined during the normal operation of said spark plug by observing the rate of change indicated by said gas pressure detecting means.

2. An apparatus for determining the rate of gas leakage from a combustion chamber of an operating internal combustion engine through its installed spark plug and around the fitted portion thereof where it extends into the interior of said combustion chamber, comprising in combination means for completely enclosing all portions of the spark plug which extend exteriorly of said combustion chamber, said enclosing means contacting the outer wall of said combustion chamber at the base of said spark plug where it enters the engine, and means for detecting changes in the gas pressure within said enclosure, said enclosing means including means for applying an ignition potential to the electrode of said spark plug without permitting gas leakage from said enclosure, whereby the rate of gas leakage may be determined during the normal operation of said spark plug by observing the rate of change in gas pressure indicated by said pressure detecting means.

3. In a spark plug gas leakage measuring device, a barrel having a plug receiving cavity in the end thereof, means forming a gas-tight seal around the edge of said cavity, means for detecting changes in the gas pressure within said cavity, and means for supplying an ignition current to an operating spark plug enclosed within the said spark plug receiving cavity without permitting any gas leakage thereabout.

4. In a spark plug gas leakage measuring device, a cylindrical barrel, a handle at an end thereof, a plug receiving cavity at the other end, means forming a gas-tight seal around the edge of said plug receiving cavity when a manual force is applied to said handle, a gas-tight self-restoring bellows having its interior connected to the said cavity so that gas pressure within said cavity is transmitted to the interior of said bellows causing an expansion or contraction thereof, visible means for indicating the expansion or contraction of said bellows, and means for supplying an ignition current to the spark plug enclosed within said spark plug receiving cavity without permitting gas leakage thereabout.

5. An apparatus for determining the rate of gas leakage from a combustion chamber of an operating internal combustion engine through its installed spark plug and around the fitted portion thereof where it extends into the interior of said combustion chamber, comprising a member containing a cavity adapted to receive the exteriorly protruding portion of an installed and operating spark plug when the member is placed over the spark plug installed in the combustion chamber from which gas leakage measurements are to be made, means forming a gas-tight seal between the surface edges of the walls of said member defining the cavity and the exterior surface of said combustion chamber when a force is manually applied to said member, means for detecting a change in pressure within said gas-tight cavity and means for applying ignition potential to the spark plug within said cavity without permitting gas leakage thereabout, whereby the rate of gas leakage may be determined during the normal operation of said spark plug by observing the rate of change in gas pressure detected by said pressure detecting means.

6. In a spark plug leakage measuring device, comprising in combination a cylindrical barrel containing a central chamber and a plug receiving cavity at an end thereof, a gas-tight seal forming gasket of plastic material distributed around the edge of said plug receiving cavity, a liquid completely filling the said central chamber, a fluid-tight diaphragm interposed between the said plug receiving cavity and the said liquid filled central chamber so that gas pressure on the cavity side of the said diaphragm will cause the same to expand and displace liquid from the said liquid filled chamber, an outwardly visible graduated capillary tube one end of which is a continuation of the said liquid filled chamber and the other end of which is open to the atmosphere, so that displaced liquid will enter the interior of the said capillary tube and afford an exact measure of the displaced liquid, and an insulated electrical conductor with a spring spark plug contact sealed into the cylindrical barrel of the plug receiving cavity end thereof for supplying an ignition current to a spark plug under test.

7. An apparatus for determining the rate of gas leakage from a combustion chamber of an operating internal combustion engine through its installed and operating radio shielded spark plug, comprising in combination a radio shielding elbow defining an enclosure, a conductor in said elbow insulated from the metallic sides thereof, one end being adapted to connect with the electrode of a spark plug, means connecting the end of said elbow containing said end of said conductor with the spark plug radio shield, so as to form a gas-tight connection therewith, and means forming a gas-tight seal at the other end of said elbow between said conductor and said elbow whereby said enclosure will be rendered gas-tight, a normally open manually operated pressure sealing and releasing valve connected to said elbow to provide at all times other than during gas leakage rate measurements a vent to atmosphere of the gas leakage through said spark plug and means for detecting the changes in gas pressure within said enclosure, whereby the rate of gas leakage through the plug may be determined during the normal operation of said spark plug by manually closing said valve and observing the rate of change in gas pressure indicated by said gas pressure detecting means.

8. An apparatus for determining the rate of gas leakage from a combustion chamber of an operating internal combustion engine through an installed and operating spark plug comprising a cap forming an enclosure with said spark plug, means carried by said cap to make contact between the electrode of said spark plug and an ignition supply cable, means securing said cap to said spark plug for rendering said enclosure gas-tight, a normally open manually operated pressure sealing and releasing valve connected to said cap to provide at all times other than during gas leakage rate measurements a vent to atmosphere of the gas leakage through the spark plug and means for detecting the changes in gas pressure within said enclosure, whereby the rate of gas leakage through the spark plug may be determined during the normal operation of said spark plug by manually closing said valve and observing the rate of change in gas pressure indicated by the gas pressure detecting means.

9. An apparatus for determining the rate of gas leakage from a combustion chamber of an operating internal combustion engine through an installed and operating radio shielded spark plug comprising in combination an ignition cable shielding means forming an enclosure for connecting said ignition cable to said spark plug, sealing means for rendering said enclosure gas-tight, said sealing means including a normally open manually operated pressure sealing and releasing valve and means for detecting changes in pressure within said gas-tight enclosure, whereby the rate of gas leakage through the plug may be determined during normal operation of said spark plug by manually closing said valve and observing the change in gas pressure as detected by said gas pressure measurements.

MELVILLE F. PETERS.
JOHN P. BOSTON.